(12) United States Patent
Popa

(10) Patent No.: US 9,051,013 B1
(45) Date of Patent: Jun. 9, 2015

(54) DRAG REDUCING DEVICE FOR COMMERCIAL VEHICLES

(71) Applicant: James W. Popa, Grass Valley, CA (US)

(72) Inventor: James W. Popa, Grass Valley, CA (US)

( * ) Notice: Subject to any disclaimer, the term of this patent is extended or adjusted under 35 U.S.C. 154(b) by 0 days.

(21) Appl. No.: 14/580,504

(22) Filed: Dec. 23, 2014

Related U.S. Application Data

(60) Provisional application No. 61/919,920, filed on Dec. 23, 2013.

(51) Int. Cl.
B62D 35/00 (2006.01)

(52) U.S. Cl.
CPC .................................. *B62D 35/004* (2013.01)

(58) Field of Classification Search
CPC .................................................. B62D 34/004
See application file for complete search history.

(56) References Cited

U.S. PATENT DOCUMENTS

| | | | |
|---|---|---|---|
| 2,737,411 A | 8/1952 | Potter | |
| 4,030,779 A * | 6/1977 | Johnson | 296/180.4 |
| 4,553,781 A * | 11/1985 | Johnson | 254/327 |
| 4,601,508 A | 7/1986 | Kerian | |
| 4,688,841 A * | 8/1987 | Moore | 296/180.4 |
| 4,741,569 A | 5/1988 | Sutphen | |
| 4,978,162 A | 12/1990 | Labbe | |
| 5,058,945 A * | 10/1991 | Elliott et al. | 296/180.5 |
| 5,823,610 A * | 10/1998 | Ryan et al. | 296/180.4 |
| 6,467,833 B1 * | 10/2002 | Travers | 296/180.4 |
| 6,789,839 B1 | 9/2004 | Samuelson | |
| 8,025,329 B1 * | 9/2011 | Kron | 296/180.4 |
| 2012/0126572 A1 * | 5/2012 | Hjelm et al. | 296/180.1 |

\* cited by examiner

*Primary Examiner* — Lori L Lyjak
(74) *Attorney, Agent, or Firm* — Daniel Boudwin; Global Intellectual Property Agency LLC

(57) ABSTRACT

A drag reducing device for a commercial vehicle. The drag reducing device includes a rectangular frame having a pair of hinged sections. The frame is securable to the rear of the commercial vehicle and is sized so as to cover approximately half of the rear of the vehicle. The frame can be unfolded so that the hinged sections are arranged in the same plane and such that the frame covers the rear of the vehicle. The frame supports an inflatable member thereon, wherein the inflatable member is shaped such that it tapers towards a point at a rear portion thereof. The inflatable member substantially covers the rear of the tractor trailer when in use. Optionally, a control unit is provided for remotely inflating or deflating the inflatable member, wherein the control unit operates an air pump disposed within the frame.

10 Claims, 6 Drawing Sheets

DRAG REDUCING DEVICE FOR COMMERCIAL VEHICLES

CROSS REFERENCE TO RELATED APPLICATION

This application claims the benefit of U.S. Provisional Application No. 61/919,920 filed on Dec. 23, 2013. The above identified patent application is herein incorporated by reference in its entirety to provide continuity of disclosure.

BACKGROUND OF THE INVENTION

1. Field of the Invention

The present invention relates to drag reducing devices for commercial vehicles. More specifically, the present invention provides a drag reducing device comprising an inflatable member disposed on a foldable frame securable to a rear portion of a tractor trailer or similar commercial vehicle for the purpose of reducing drag and turbulent air flow on the rear portion of the vehicle.

The fuel efficiency of a commercial vehicle is limited by several factors including friction from the wheels, changes in grade, power train losses, and aerodynamic drag. Aerodynamic drag is one of the largest determining factors of the vehicle's fuel efficiency, and improving the aerodynamics of a vehicle can result in substantial improvements in fuel efficiency.

As a truck drives along a road, the truck encounters air resistance or drag from the air flowing around the truck. The oncoming airflow creates a high-pressure region at the front of the vehicle, while a low-pressure region is created at the rear of the vehicle, impeding the movement of the vehicle. The drag decreases the fuel efficiency of the vehicle, and drag increases as the vehicle moves at increasing speeds. Thus, a device for improving the aerodynamics of a vehicle, particularly a tractor trailer, and that can be stored while not in use is desired.

2. Description of the Prior Art

Devices have been disclosed in the prior art that relate to drag reducing devices for vehicles. These include devices that have been patented and published in patent application publications. These devices generally relate to inflatable members securable to the rear of a tractor trailer or similar vehicle for reducing drag. The following is a list of devices deemed most relevant to the present disclosure, which are herein described for the purposes of highlighting and differentiating the unique aspects of the present invention, and further highlighting the drawbacks existing in the prior art.

One such device, U.S. Pat. No. 6,789,839 to Samuelson discloses a wind dam for use with tractor trailers. The device comprises an inflatable cone-shaped wind dam for reducing drag on the tractor trailer. The wind dam includes two longitudinally opposed sections each having an outer shell and an inflatable bladder. The cone shaped wind dam includes an inflatable mating joint for maintaining the shape of the wind dam. Thus, Samuelson fails to disclose a drag reducing device having a hinged frame removably securable to the rear portion of a tractor trailer.

Another device, U.S. Pat. No. 4,601,508 to Kerian discloses a streamlining appendage for a vehicle. The device comprises a rearwardly tapering peripheral body defining a chamber. An opening is provided that allows air flow to pass therethrough and out of the rearward end of the vehicle. Thus, the device serves to dissipate the partial vacuum that forms behind a vehicle while in motion. However, Kerian fails to disclose a device having a hinged frame with an inflatable member supported thereon.

U.S. Pat. No. 2,737,411 to Potter discloses an inflatable streamlining apparatus for vehicles. The device includes an inflatable member having a streamlined construction securable to the rear portion of a tractor trailer or similar vehicle. The device includes retracting means for rolling the inflatable member for storage. Thus, Potter discloses an inflatable streamlining device, but fails to disclose a hinged frame having two sections that support an inflatable member thereon.

U.S. Pat. No. 4,978,162 to Labbé discloses a drag reducer for the rear end of a vehicle. The drag reducer includes a piece of flexible material adapted to fit tightly around the periphery of the rear of a truck. The piece of material displays a convex surface when fully extended. The material includes openings thereon such that movement of the truck causes air to flow into the device causing it to inflate. Thus, Labbé discloses a device that inflates as the truck moves, and does not disclose a device that allows the user to control inflation and deflation thereof.

U.S. Pat. No. 4,741,569 to Sutphen discloses an inflatable drag reducer for a vehicle. The device can be attached to the rear doors of the vehicle and can be inflated to form an apex at the rear thereof. The device can be flattened or deflated so as to allow easy access to the rear of the vehicle. Thus, Sutphen discloses an inflatable drag reducer, but fails to disclose a hinged frame securable to the rear of the vehicle.

Finally, U.S. Pat. No. 6,467,833 to Travers discloses a drag reducer. The device includes a frame hinged to the rear of a vehicle and an inflatable bag secured thereon. The inflatable bag includes at least two converging panels defining a drag reducing structure. Thus, Travers fails to disclose a frame having a pair of hinged sections that supports an inflatable member thereon, wherein the inflatable member tapers to a point at the rear portion thereof.

These prior art devices have several known drawbacks. The devices in the prior art variously relate to drag reducing structures for commercial vehicles, such as tractor trailers. However, such devices may limit access to the rear of the vehicle and cannot be easily arranged in a stored configuration. Further, the devices do not include a frame having a pair of hinged sections that allows the inflatable member to be concealed within the frame for storage.

In light of the devices disclosed in the prior art, it is submitted that the present invention substantially diverges in design elements from the prior art and consequently it is clear that there is a need in the art for an improvement to existing drag reducing devices for commercial vehicles. In this regard the instant invention substantially fulfills these needs.

SUMMARY OF THE INVENTION

In view of the foregoing disadvantages inherent in the known types of drag reducing devices now present in the prior art, the present invention provides a new drag reducing device wherein the same can be utilized for providing convenience for the user when improving fuel efficiency of a commercial vehicle by reducing drag on the rear of the vehicle while the vehicle is in motion.

It is therefore an object of the present invention to provide a new and improved drag reducing device that has all of the advantages of the prior art and none of the disadvantages.

It is another object of the present invention to provide a drag reducing device securable to the rear of a tractor trailer for reducing the low pressure area behind the vehicle.

Another object of the present invention is to provide a drag reducing device that includes an inflatable member thereon.

Yet another object of the present invention is to provide a drag reducing device having an inflatable member with a rounded construction and that tapers towards a point at the rear portion thereof.

A further object of the present invention is to provide a drag reducing device having a frame comprising a pair of sections hingedly secured to one another.

An additional object of the present invention is to provide a drag reducing device that can be alternately configured in a folded configuration when not in use, and an unfolded configuration for use while the vehicle is in motion.

Another object of the present invention is to provide a drag reducing device that can be remotely operated by the user by means of a wireless control unit.

Another object of the present invention is to provide a drag reducing device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
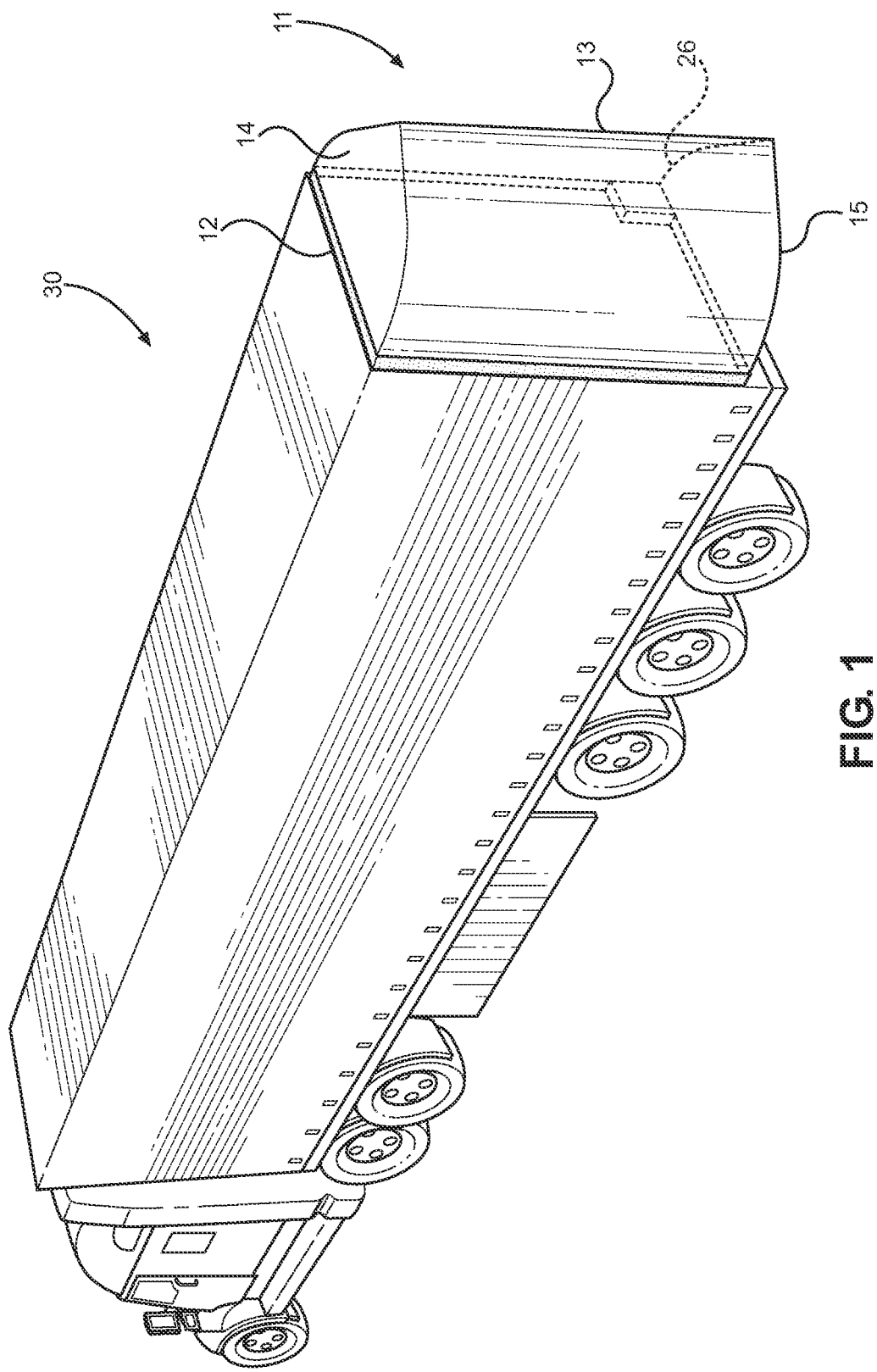
FIG. 1 shows a perspective view of the drag reducing device of the present invention as fully inflated.

Reference is made herein to the attached drawings. Like reference numerals are used throughout the drawings to depict like or similar elements of the drag reducing device of the present invention. For the purposes of presenting a brief and clear description of the present invention, the preferred embodiment will be discussed as used for reducing drag at the rear of a tractor trailer or similar vehicle. The figures are intended for representative purposes only and should not be considered to be limiting in any respect.

Figure 2:
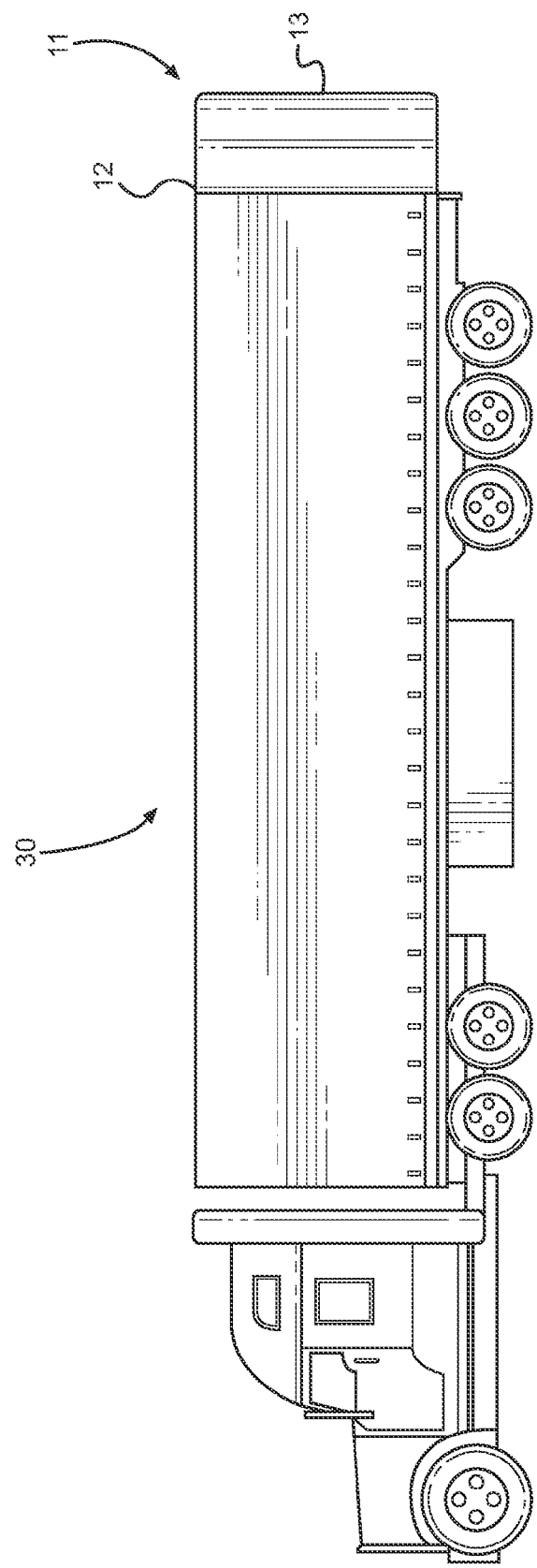
FIG. 2 shows a side view of the drag reducing device of the present invention as fully inflated.

Referring now to FIGS. 1 and 2, there are shown views of the drag reducing device of the present invention as fully inflated. The drag reducing device 11 comprises a frame 12 removably securable to the rear portion of a tractor trailer 30 or similar vehicle. The frame 12 supports an inflatable member 13 thereon. In some embodiments, the frame 12 also supports an air pump 26 adapted to inflate the inflatable member 13. The inflatable member 13 preferably comprises a cross section shaped as a triangle having a pair of curved legs, such that the inflatable member 13 resembles a triangular prism. Thus, the inflatable member 13 comprises three sides, wherein a pair of sides are curved and taper towards a point at the rear end thereof. The sides of the inflatable member 13 are preferably curved such so as to improve the aerodynamics of the inflatable member 13. The inflatable member 13 comprises an upper end 14, a lower end 15, a rear wall connected to the frame 12, and a pair of side walls that taper towards a point. The construction of the inflatable member 13 helps to reduce or eliminate the low-pressure area behind the vehicle, helping to reduce drag.

Figure 3A:
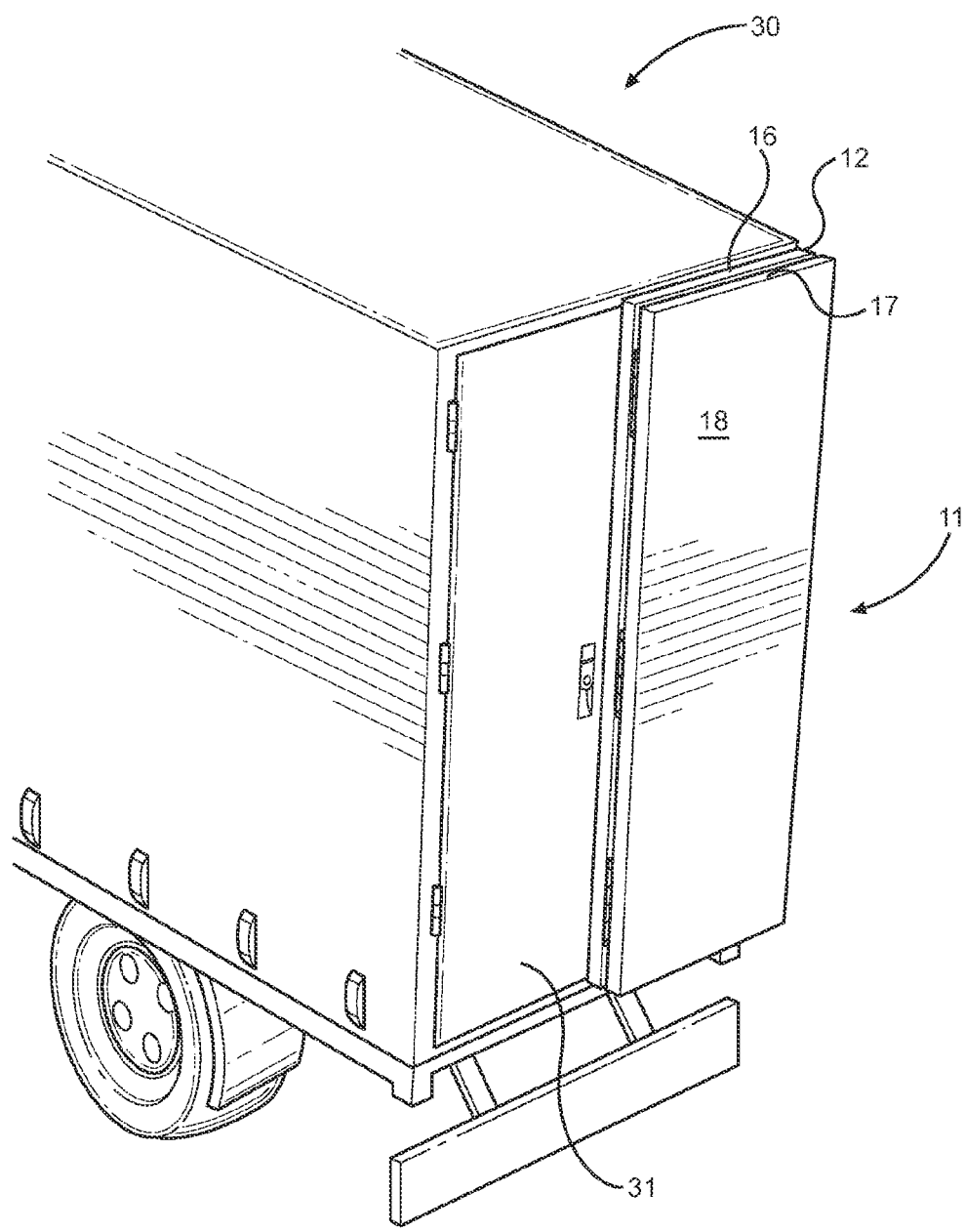
FIG. 3A shows a view of the drag reducing device in a folded and collapsed configuration.
Figure 3B:
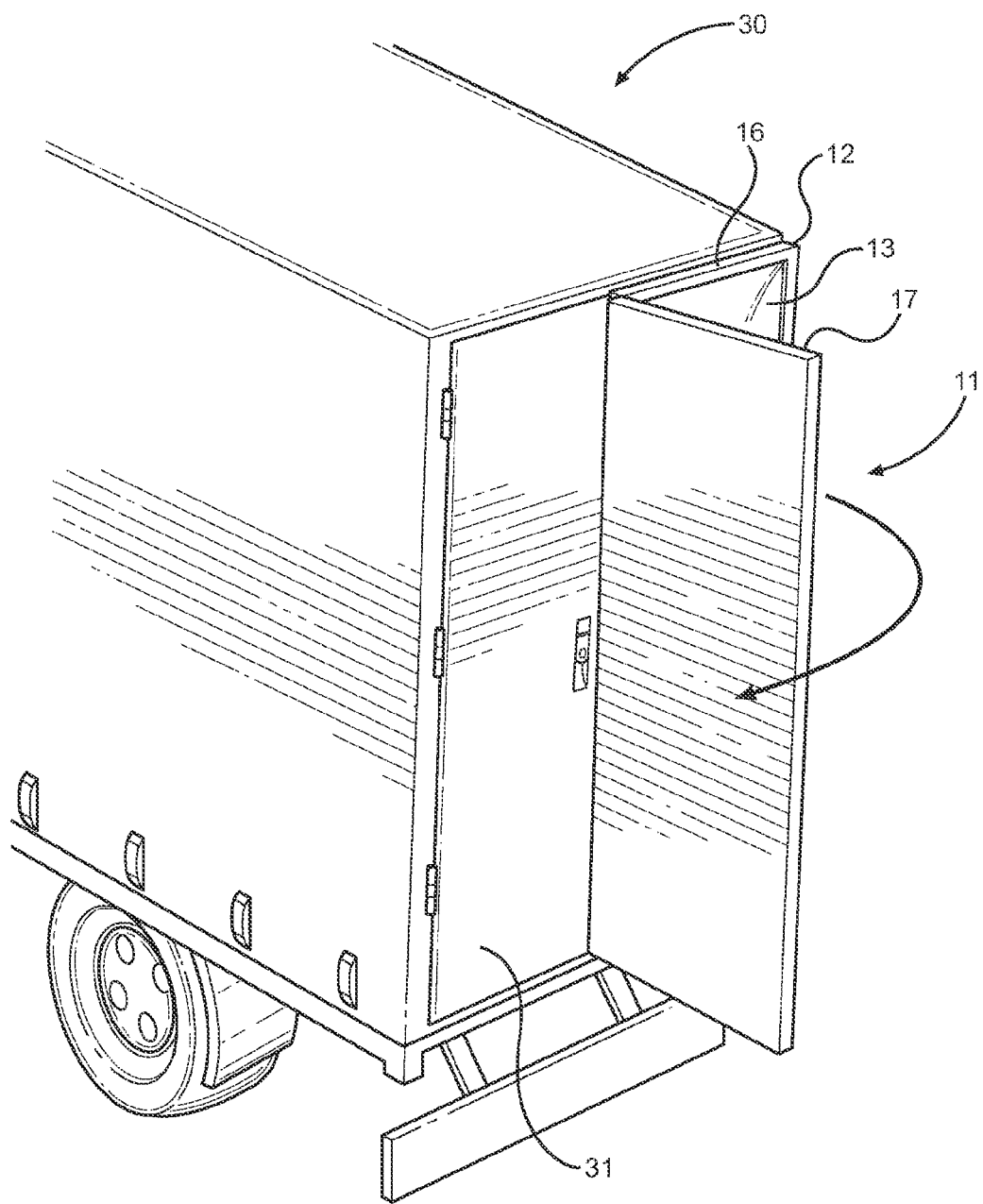
FIG. 3B shows a view of the drag reducing device as partially unfolded.

Referring now to FIGS. 3A and 3B, there are shown views of the drag reducing device in a folded and partially unfolded configuration, respectively. The frame 12 of the drag reducing device 11 is substantially rectangular and includes a pair of sections hingedly attached to one another. A first section 16 of the frame 12 can be secured to a door on the rear 31 of the tractor trailer 30, leaving the opposing door on the tractor trailer uncovered. The frame 12 can be secured to the rear 31 of the tractor trailer 30 by means of brackets and fasteners, such as screws and bolts, among other conventional fastening methods. The frame 12 is sized substantially similarly to the dimensions of the door so that the door is fully covered.

The second section 17 of the frame 12 can be disposed in a folded or unfolded configuration. In the folded configuration, the second section 17 rests flush against the first section 16 so as to enclose and protect the inflatable member 13 therein. The exterior surface 18 of the second section 17 is planar and solid such that the inflatable member 13 is concealed by the first and second sections 16, 17. The folded configuration provides the user with access to the opposing door of the tractor trailer, allowing the user to easily access the rear of the vehicle. Further, the door on which the frame 12 is installed can also be opened with the frame 12 secured thereon. In an unfolded configuration, the second section 17 lies flat against the other door of the tractor trailer, and can be secured thereto using any suitable fasteners, such as brackets, bolts, screws, and the like. Further, in the unfolded configuration, the first 16 and second sections 17 lie in the same plane. In this configuration, the inflatable member 13 is exposed, and can be fully inflated.

Figure 4:
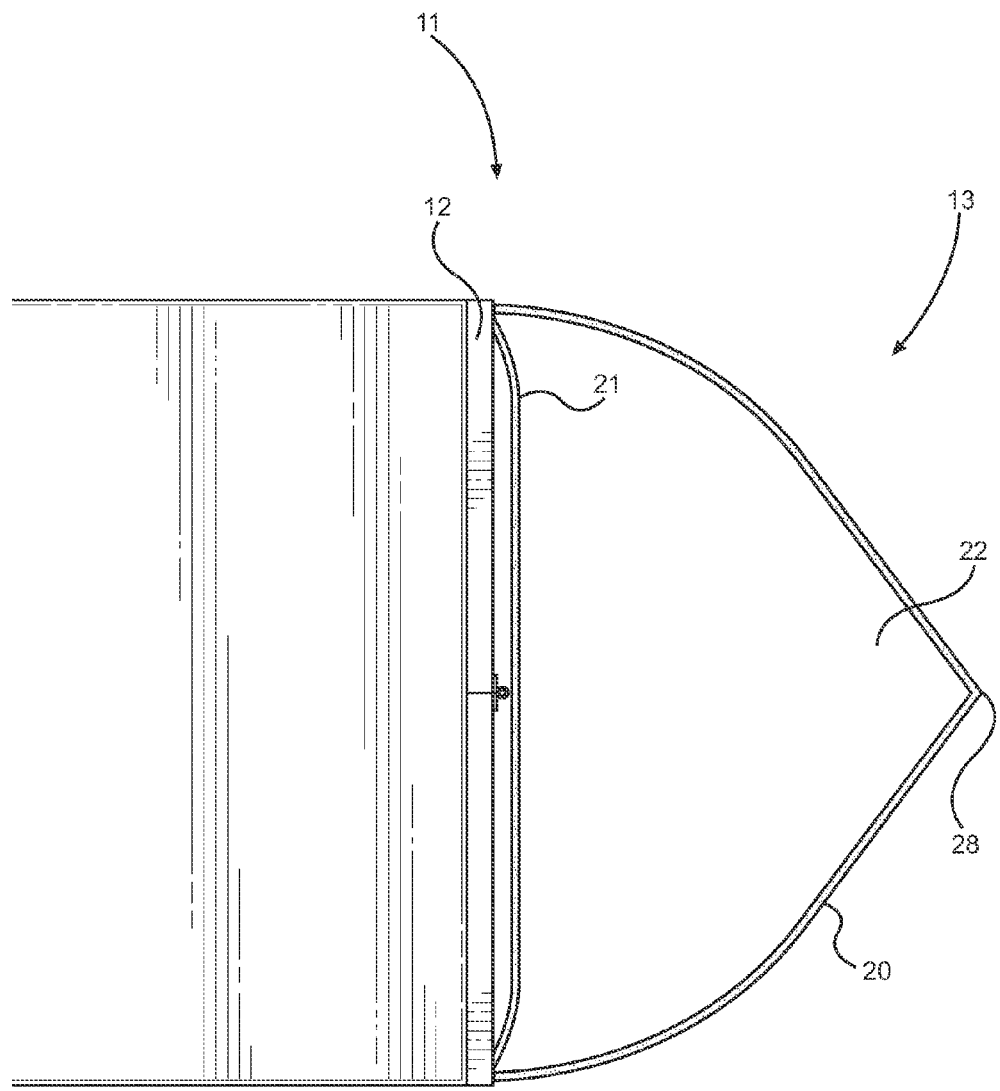
FIG. 4 shows a top down cross sectional view of the drag reducing device of the present invention.

Referring now to FIG. 4, there is shown a top down cross sectional view of the drag reducing device of the present invention. The frame 12 of the drag reducing device 11 is secured to the rear portion of a commercial vehicle. The inflatable member 13 is attached thereto, and the inflatable member includes a pair of sidewalls 20 and a rear wall 21 that defines an enclosed interior volume 22. The pair of sidewalls 20 meet at a point 28 disposed at the rear of the inflatable member 13, wherein the point 28 is centrally located such that the inflatable member 13 is substantially symmetrical. The interior volume 22 is substantially air tight so that air cannot escape from the inflatable member 13 when inflated. The interior volume 22 can be filled with air in order to inflate the inflatable member 13, causing the pair of sidewalls 20 to extend outward from the rear of the vehicle. At least a portion of the rear wall 21 is secured to the frame 12 so that the inflatable member is securely attached to the frame 12. In alternate embodiments, the inflatable member comprises only a pair of sidewalls 20 and the frame 12 is solid and serves as the rear wall of the inflatable member, defining an air tight interior volume.

Figure 5:
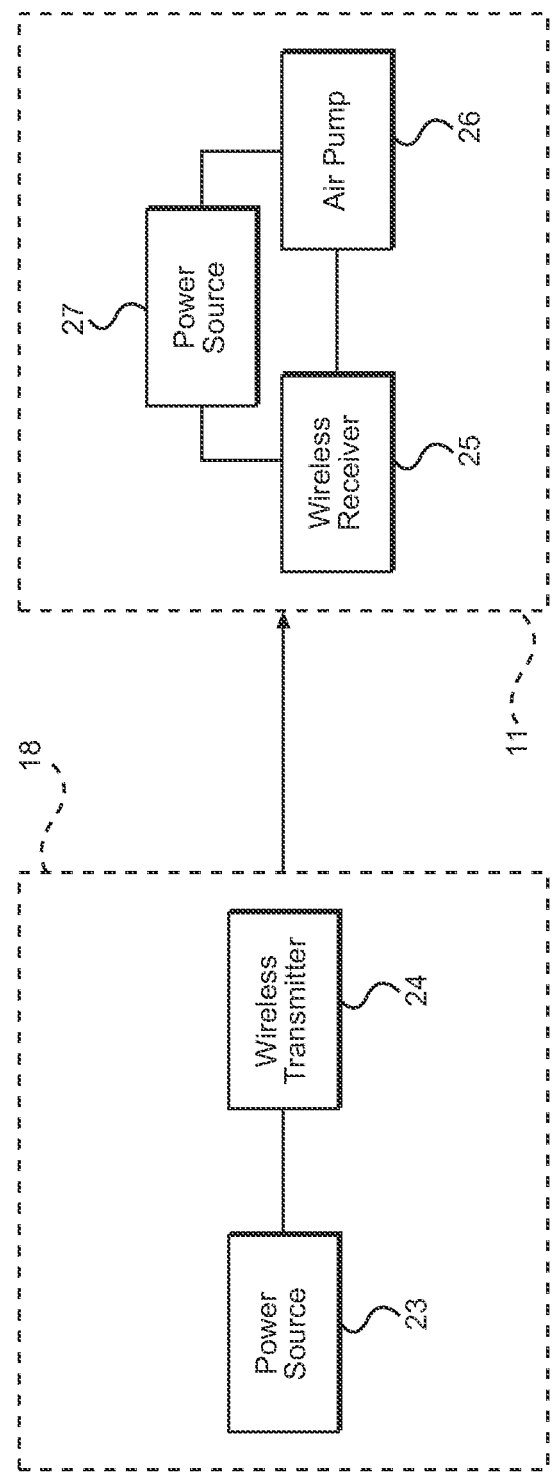
FIG. 5 shows a diagram of the operation of the drag reducing device of the present invention.

Referring now to FIG. 5, there is shown a flowchart of the operation of the drag reducing device of the present invention. In the illustrated embodiment, the drag reducing device 11 can be remotely controlled via a control unit 18. The control unit 18 includes one or more switches or buttons thereon for inflating or deflating the inflatable member. The control unit 18 can be in wired or wireless connection with the drag reducing device. The control unit 18 can resemble a key fob or can be integrated onto the dashboard or center console of the vehicle. In wireless embodiments of the present invention, the control unit 18 includes a power source 23 and a wireless signal transmitter 24 adapted to send a signal to a signal receiver 25 of the drag reducing device 11. When the signal receiver 25 receives a signal from the wireless transmitter 24, the air pump 26 is activated causing the inflatable member to inflate or deflate as desired by the user. The signal receiver 25 and air pump 26 may include a power source 27 for powering the same. The air pump 26 is preferably secured on the frame, and the frame, and the power source 27 may similarly be positioned on the frame. The air pump 26 preferably comprises a thin profile so that it can fit on the frame and allow the frame to be positioned in a folded configuration.

In alternate embodiments, the inflatable member 13 may include a valve that allows a user to insert a tube or hose therein so that the inflatable member 13 can be filled with air from an external air pump. Thus, in such embodiments no air pump or power source is integrated into the drag reducing device, and an external air pump can be used to inflate the inflatable member. In other embodiments, the air pump can be mounted to the underside of the commercial vehicle and is connected to the inflatable member by means of a length of tubing. In this way, the air pump does not need to be carried on the frame on which the inflatable member is supported.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A drag reducing device securable to the rear of a commercial vehicle, comprising:
    a rectangular frame having a first section hingedly attached to a second section, wherein a first section is adapted to be mounted to a rear portion of a commercial vehicle;
    an inflatable member disposed on said frame;
    wherein said second section can be rotated so as to be positioned flush against said first section in a folded configuration so as to enclose said inflatable member therein;
    wherein said second section can alternately be rotated so as to lie in the same plane as the second section so as to allow said inflatable member to be inflated.

2. The drag reducing device of claim 1, wherein said inflatable member is shaped so as to taper towards a point at a rear end thereof.

3. The drag reducing device of claim 1, wherein said inflatable member resembles a triangular prism when fully inflated.

4. The drag reducing device of claim 1, further comprising a control unit adapted to operate an air pump in fluid communication with said inflatable member.

5. The drag reducing device of claim 4, wherein said control unit is in wireless communication with said air pump.

6. The drag reducing device of claim 1, wherein said second section of said frame is removably securable to said rear portion of said commercial vehicle.

7. The drag reducing device of claim 1, wherein said first section of said frame is sized so as to cover a door on said rear portion of said commercial vehicle.

8. The drag reducing device of claim 1, wherein said inflatable member covers said rear portion of said commercial vehicle when fully inflated.

9. The drag reducing device of claim 1, wherein said inflatable member comprises a pair of sidewalls and a rear wall defining an enclosed interior volume, wherein said inflatable member is air tight.

10. The drag reducing device of claim 9, wherein said rear wall of said inflatable member is secured to said frame.

\* \* \* \* \*